March 20, 1934.  W. H. SHIFFLER ET AL  1,951,740
PROCESS OF CATALYTIC HYDRATION OF OLEFINES
Filed Aug. 22, 1930
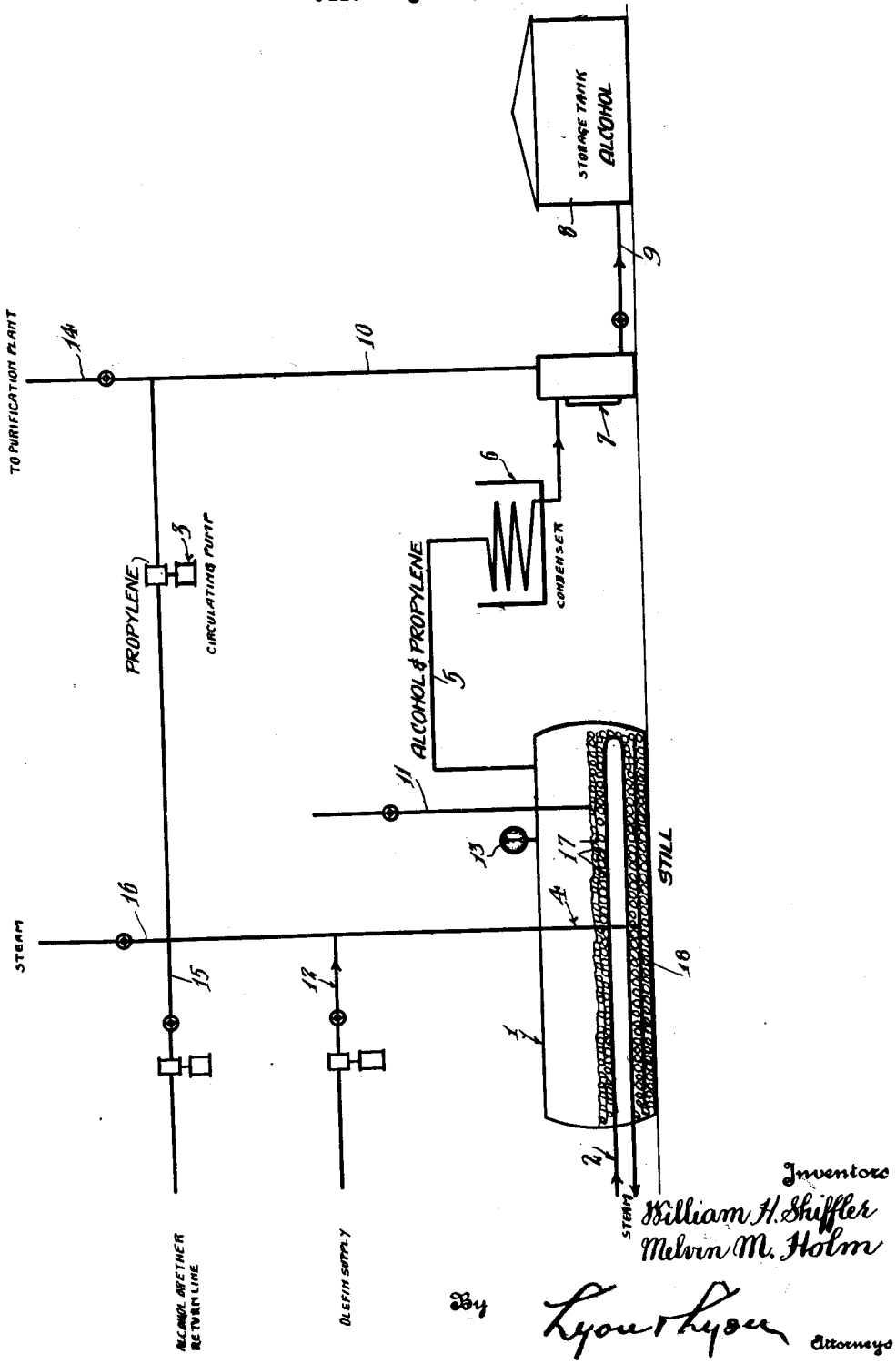

Patented Mar. 20, 1934

1,951,740

UNITED STATES PATENT OFFICE 1,951,740

PROCESS OF CATALYTIC HYDRATION OF OLEFINES

William H. Shiffler and Melvin M. Holm, Berkeley, Calif., assignors to Standard Oil Company of California, San Francisco, Calif., a corporation of Delaware Application August 22, 1930, Serial No. 477,147

17 Claims. (Cl. 260—156)

This invention relates to a process for catalytic hydration of olefines containing two and three carbon atoms through the use of sulfuric acid as a catalyst. In particular, the process relates to the production of either ethyl alcohol or ethyl ether or both from ethylene and of isopropyl alcohol from propylene, or from gases containing the same.

Heretofore, various attempts have been made to convert these lower olefines to alcohols. With the use of sulfuric acid these attempts have been largely through the absorption of the olefines in relatively strong sulfuric acid with a consequent formation of the alkylsulfuric acids. The alkylsulfuric acid has then been diluted with the hydrolysis of the alkylsulfuric acids to alcohol.

The alcohols have then been distilled from the dilute sulfuric acid solutions thus produced. This procedure includes several inherent disadvantages, among which are: first, the fact that considerable quantities of the olefines are polymerized to oils by which the ultimate yield of alcohols is reduced; second, three separate steps are involved in the process requiring considerable expense for equipment and operation, and third, large quantities of dilute sulfuric acid are produced which must be concentrated for reuse in the process.

It is the general object of the present invention to provide a process by which these lower olefines may be hydrated into alcohols in a single operation and in which the polymerization of the olefines to oil is practically eliminated, and by which the yield of alcohols is very materially increased and the cost of equipment and operation of the process materially reduced.

By the process of the present invention we are able to produce high yields of alcohol from the lower olefines without substantial polymerization of the olefines to oils and without the necessity of dilution of the sulfuric acid used so that the cost incidental to reconcentrating sulfuric acid is removed.

We have also discovered that the process may be utilized for the efficient production of ether from ethylene and that by slight modifications of the manipulation of the process the process may be caused to produce solely ethyl alcohol or solely ethyl ether, or both products simultaneously.

In the hydration of olefines and alcohols by a three-step process which involves the absorption of the olefines in acid, the dilution of the acid and distillation of the alcohols from the diluted acid, it is recognized that concentrated sulfuric acids and relatively low temperatures should be employed such, for example, as acids containing about between 95% and 100% sulfuric acid and temperatures of from 90° F. to 200° F. depending upon the particular olefine to be absorbed. An attempt is made to secure a complete absorption of the olefines by the concentrated sulfuric acid in one passage of the olefines into the acid. Generally considered, the process of the present invention embodies the use of a comparatively dilute sulfuric acid preferably containing not over 80% sulfuric acid and temperatures sufficient to cause the volatilization of the hydration products as they are formed. The olefines are passed continuously through the sulfuric acid preferably accompanied by the addition of sufficient steam to maintain the concentration of the acid constant throughout the process. In this manner only part of the olefines are absorbed by the sulfuric acid during a single passage of the olefines through the acid, this part being hydrated and volatilized without the necessity of any separate dilution of the acid.

By a continuous condensation from the gas of the hydration products produced and a continuous recirculation of the unreacted olefines back for further contact with the acid a substantially complete hydration of the olefines may be caused to take place.

In the process the sulfuric acid remains unchanged in strength and quantity, thus operating as a catalyst for the direct hydration of the olefines.

It has also been discovered that the conversion of the ethylene to ethyl ether and ethyl alcohol is an equilibrium reaction and that by maintaining in the ethylene gas passed through the acid a correct quantity of either ether or alcohol, the reaction may be caused to produce either solely ether or solely alcohol. It has also been discovered that the conversion of propylene to isopropyl alcohol is an equilibrium reaction, but that very little isopropyl ether is produced under the conditions most favorable for the production of isopropyl alcohol.

It has been further discovered that while in ultimate effect the process is a direct catalytic hydration of the olefines, it takes place apparently in two steps occurring simultaneously in the process, the first step consisting of an absorption of the olefines by the acid and the second step the distillation of the alcohols from the acid. A sufficient surface of sulfuric acid may be supplied to insure adequate contact with all of the olefine gas and yet the rate of hydration of the olefines may be so slow as to render the process commercially impractical.

When, however, a considerable body of sulfuric acid is supplied for contact with the gas a high rate of production may be obtained.

It has been further found that the catalytic hydration of olefines takes place best with acids between 20 and 80% in strength. The weaker acids provide a lower production rate, while on the other hand, the stronger acids have a tendency to polymerize or oxidize the olefines. It has been further found that by operating the process under a pressure which is high the rate of production of the process may be materially increased. High pressures have also a tendency to increase the ratio between the amount of ether and the amount of alcohol produced.

The present invention will best be understood from a description of one or more examples of the invention. For this purpose we have hereafter set forth the preferred form or forms of processes embodying the invention. The process is described in connection with the accompanying drawing, in which:

The figure is a diagrammatic view of an apparatus suitable for conducting the process.

In the drawing, 1 represents a contacting chamber, in this instance a vessel preferably lined with lead and brick. The chamber may be about two-thirds filled with suitable packing material such as stoneware Raschig rings 17. The contents of the chamber may be supplied with heat by a suitable means, such as the closed steam coil 2. Olefine gas is supplied through lines 12 and 4, being distributed evenly through the chamber by means of a perforated distributing coil 18. Steam from line 16 is passed into the chamber through lines 4 along with the olefine gas. Unreacted olefine gas and steam mixed with alcohol and ether vapors together with impurities or diluents carried in the gas fed, leave the chamber through line 5 and enter the condenser 6 where most of the alcohol, ether and steam are condensed. The condensed liquid is separated from the gas in a drum 7 and sent through line 9 to the storage tank 8. The unreacted gas leaves the top of the drum 7 through line 10 where it may be passed by means of a circulating blower 3 back to the chamber through line 4 and the cycle repeated. If the olefine gas contains impurities, such as ethane and methane or propane, part of the cycle of gas may be returned to a purification plant through line 14. A pressure gauge 13 indicates the pressure in the system. The condensate is pumped from the storage tank 8 to a still, not shown, where the alcohol and ether may be separated. If it is desired to return either the alcohol or ether to chamber 1, this may be done through line 15.

The process will first be described as applied to the production of ethyl ether or ethyl alcohol from ethylene. The catalyst employed is preferably sulfuric acid of a strength between 20% and 75% or 80%. The most desirable strength we consider to be about 72% sulfuric acid. The reaction proceeds more slowly the weaker the acid, acids below 20% producing a negligible quantity of alcohol, while the stronger acids, especially at the higher temperatures, tend to polymerize and oxidize part of the ethylene and so reduce the yield of alcohol.

There are several ways in which the catalyst may be contacted with the ethylene gas but it is important that not only a large reactive surface of the catalyst and olefine be obtained but that there be an ample volume of sulfuric acid in the process. One method of contacting the gas with the acid is to fill a chamber about two-thirds full of sulfuric acid and bubble the gas through the acid. Preferably, the chamber also contains sized acid-proof screenings or small stoneware Raschig rings which are immersed in the acid. Reaction rates have been obtained by passing the ethylene through a large body of sulfuric acid containing a suitable packing material which are twenty times the reaction rates which are obtained when sulfuric acid is contacted with the ethylene gas by passing the gas upwardly through a shower of acid.

It appears that the catalytic reaction is a two-step process and unless there is a large body of acid present a low reaction rate will be obtained even when all of the gas is thoroughly contacted with the acid.

Preferably, the acid is maintained at a temperature of 250° F. or above and we find that the most desirable operating temperature is 300° F.

The entire process is preferably maintained under pressure. We have employed pressures ranging between atmospheric and 300 pounds per square inch gauge in the process but we find that pressures above 135 pounds are desirable from an operating standpoint.

The foregoing example of pressure is the pressure we prefer to employ when using a gas containing 30% of ethylene and 70% of impurities. In other cases the partial pressure of ethylene to be employed in the process will vary between the limits of 15 and 100 lbs. per square inch gauge and the preferred ethylene partial pressure of the gas is about 40 lbs. per square inch gauge.

The ethylene gas may be pure ethylene gas if the same is obtainable, but we prefer to employ a gas produced by fractionation of the gases obtained from hydrocarbon cracking processes which contains between 50 and 80% ethylene. Simultaneously with the introduction of ethylene we introduce sufficient steam or water into the catalyst to compensate for the water lost from the acid during the process, and thus maintain the acid throughout the process at a constant strength. It is desirable to introduce water or steam continuously or simultaneously with the ethylene, but, since there is a wide range of acid strengths over which the process is satisfactorily operable, the water or steam may be added intermittently or from time to time.

As a check as to whether the proper amount of water or steam is being added to the process, the strength of acid in the chamber may be analyzed from time to time by withdrawing samples of the acid through the line 11.

There issues from the sulfuric acid catalyst mixed vapors of ethyl alcohol and ethyl ether and unconverted ethylene and diluent gases if such diluent gases exist in the gas being processed. The stream of gases and vapors passes out of the chamber to the condenser and the vapors condense so that alcohol and ether are collected. The gases, after separation of the alcohol and ether, may be returned to the process for further conversion.

Under the operating conditions that we have found most suitable for the process, only about 1–4% of ethylene is converted to alcohol during the single passage of the ethylene through the catalyst. It is important that the alcohol and ether be condensed from the vapors leaving the chamber before the unreacted gas is recycled or again contacted with the acid, as apparently but little further conversion of ethylene into alcohol can take place while the alcohol produced remains with the ethylene gas.

By condensing the alcohol from the ethylene gas and returning the same to the system with sufficient make-up gas to maintain a constant pressure on the system, the process is rendered continuous and a high yield of hydration products may be obtained from the ethylene. Impurities in the gas such as methane, ethane and the like, are prevented from building up in the system by a release of part of the gas to be recycled or by returning a part or all of the gas to a purification plant through the line 14. In the purification plant the gas may be fractionated to concentrate its ethylene content and then the gas may be returned to the process.

The rate of release of such gas for purification may be determined by the alcohol strength desired in the condenser and by the amount of impurities in the make-up gas and this may be conveniently done by analyzing the gas in the system at intervals and maintaining the olefine content constant. As the impurities build up in the system the partial pressure of the ethylene is reduced and the ratio of water to alcohol in the condenser increases. The ethyl alcohol and ethyl ether collected in the storage tank are separated by distillation.

When it is desired that the process should produce only alcohol the ether which is condensed from the vapors is returned to the system. The ether then builds up in the system to a maximum value and all further hydration of ethylene results only in the formation of alcohol. In a similar manner the process may be made to form only ether by a return to the catalytic zone of the alcohol produced in the system. By regulating the relative amount of alcohol or ether added to or returned to the gases entering the chamber the production of these products may therefore be varied at will.

In further explanation of the operating conditions of the process it may be pointed out that using acid of 65% H$_2$SO$_4$ and temperatures and pressures of 260° F. and 1 atmosphere of ethylene, respectively, the rate of production of the hydration products is only about .1 that under the conditions preferred, as previously described. In addition, considerable more water is removed from the reaction chamber, thereby producing more dilute solution of alcohol in the storage tank. In general, it may be stated that higher pressures tend towards a greater production of ether than do the lower pressures. Thus, it will be seen that a proper combination of temperature, acid strength and pressure is important to obtain a proper production rate and a proper strength of alcohol.

When the ethylene gas is first passed through fresh acid in the chamber a considerable period of time generally elapses before the alcohol production reaches its maximum. Thus, several hours time usually passes before the alcohol production arrives at a maximum value. The alcohol production apparently does not reach a maximum until sufficient ethylene has been absorbed and retained by the acid to reach a certain maximum formation of alkyl sulfuric acid. The production of alcohol is dependent upon the decomposition of the alkyl sulfuric acid and a high rate of production is dependent upon having a large volume of acid present in which this decomposition reaction may be taking place.

When the process is used with propylene or with gases containing propylene the procedure of the process is very similar. The results differ only in that a very little ether is produced with propylene, the main product being isopropyl alcohol. The preferred operating conditions with propylene are 55% sulfuric acid, a temperature of 200 or 270° F., or above or about, preferably, 240° F. and a pressure above atmospheric. At a temperature of 210° F. the production rate is only about ⅔ that of 240° F. At an acid strength of 46% the rate of production is only about ½ that at 55%. At a pressure of 30 pounds gauge the production is about 2½ times that at atmospheric pressure. In addition, the strength of alcohol produced is increased about 2½ times.

In general, with both ethylene and propylene it will be seen that the process may be satisfactorily operated with stronger or weaker acids than those specified in the examples given above and with pressures higher or lower than those specified. With the weaker acids, higher temperatures and/or higher pressures should be employed for obtaining efficient results.

While the process herein described is well adapted for carrying out the various objects and advantages of the present invention, it is to be understood that we do not wish to be limited to the embodiment set forth, and the invention is of the scope of the appended claims.

We claim:

1. A process of simultaneously manufacturing alcohols and ethers from olefines containing two and three carbon atoms which comprises, bringing olefine containing gas into contact with dilute sulfuric acid at a temperature and concentration of acid sufficient to cause an absorption of a minor percentage only of the olefines by the sulphuric acid in a single passage, the absorbed olefines being converted to an alkyl sulphate and simultaneously hydrolyzed with the formation of alcohols and ethers which are volatilized and removed from the acid simultaneously with the unreacted olefines, condensing a part of such products from the unreacted olefines, and recycling olefines again into contact with the sulfuric acid, the sulphuric acid being maintained in substantially uniform concentration during contact with the olefines.

2. A process of simultaneously manufacturing alcohols and ethers from olefines containing two and three carbon atoms which process comprises, bringing olefine containing gas into contact with dilute sulfuric acid at a superatmospheric pressure and a temperature above about 240° F. sufficient to cause the absorption of but a minor percentage of such olefines with a simultaneous transformation of the olefines to alkyl sulphates and then a transformation of the alkyl sulphates into alcohols and ethers, and the vaporization and removal of such alcohols and ethers from the acid along with the unreacted olefines, removing from the unreacted olefines a part at least of such products, recycling olefines for further contact with the sulfuric acid, and adding water or steam to the acid sufficient to compensate for that vaporized by the gas, the sulphuric acid being maintained in substantially uniform concentration during contact with the olefines.

3. A process of manufacturing alcohols and ethers simultaneously from olefines containing two and three carbon atoms which consists in bringing an olefine containing gas into intimate contact with a body of sulfuric acid catalyst at a strength and at a temperature above about 240° F. sufficient to cause a minor percentage only of the olefines to be absorbed by the acid in one passage and to cause simultaneously the absorbed olefines to be finally converted into alcohols and ethers which are vaporized from the acid and pass over with the unreacted olefines, such absorption taking place at a pressure above atmospheric, condensing a part at least of the products from the unreacted olefines, and recycling the unreacted olefines for further contact with the catalyst, the sulphuric acid being maintained in substantially uniform concentration during contact with the olefines.

4. In the manufacture of hydration products of olefines containing two and three carbon atoms, the process which includes bringing an olefine containing gas into contact with a large body of sulfuric acid between 20 and 80% in strength at a temperature sufficient to cause the absorption by the acid of a small percentage only of the olefines with the simultaneous hydration of the absorbed products to alcohols and ethers and a simultaneous volatilization of such products with the unreacted olefines, such absorption and reaction taking place at a pressure above atmospheric, removing a part at least of the products from the unreacted olefines, and reeycling the unreacted olefines, the sulphuric acid being maintained in substantially uniform concentration during contact with the olefines.

5. A process of manufacturing alcohols and ethers simultaneously from an olefine containing two and three carbon atoms which comprises, bringing a gas containing such olefines in contact with dilute sulfuric acid at a temperature above about 240° F. sufficient to cause an absorption of a minor percentage of the olefines only by the acid with a simultaneous transformation of the absorbed olefines to alcohols and ethers and a simultaneous vaporization thereof with the unreacted olefines, condensing one of such hydration products from the unreacted olefines, and returning the unreacted olefines and one of the products to the reaction zone, the sulphuric acid being maintained in substantially uniform concentration during contact with the olefines.

6. A process of manufacturing hydration products of olefines containing two and three carbon atoms which comprises, continuously passing olefines into contact with a substantial body of sulfuric acid at a temperature and concentration of acid sufficient to cause hydration of a minor percentage only of the olefines and volatilization of the alcohols and ethers formed from the olefines along with the unconverted olefine gas, continuously condensing hydration products from the olefine gas, and continuously recycling the gas again into contact with the sulfuric acid while supplying sufficient fresh gas to maintain a substantially constant pressure above atmospheric throughout the process.

7. A process of manufacturing hydration products of olefines containing two and three carbon atoms which comprises, continuously passing olefines into contact with a substantial body of sulfuric acid at a temperature and concentration of acid sufficient to cause hydration of a minor percentage only of the olefines and volatilization of the hydration products along with the unconverted olefine gas, continuously condensing hydration products from the olefine gas, and continuously recycling the gas again into contact with the sulfuric acid while supplying sufficient fresh gas to maintain a substantial constant pressure above atmospheric through the process, the sulfuric acid being maintained between 20 and 80% in strength by the passage of sufficient water vapor providing material as to compensate for the vaporization of water from the acid during the process.

8. A process of manufacturing ethyl alcohol from ethylene which comprises, bringing ethylene containing gas into contact with a substantial body of sulfuric acid at a temperature and concentration of acid sufficient to cause the hydration of the ethylene into ether and ethyl alcohol and to volatilize the hydration products from the acid along with unreacted ethylene, condensing the ethyl alcohol from the gas, recycling the ethylene gas together with fresh ethylene gas again into contact with the sulfuric acid, and recycling the ether produced in the process to prevent the formation of further ether and maintaining the acid concentration substantially uniform.

9. A process of manufacturing ethyl alcohol from ethylene which comprises, bringing ethylene containing gas into contact with a substantial body of sulfuric acid at a temperature and concentration of acid sufficient to cause the hydration of the ethylene into ether and ethyl alcohol and to volatilize the hydration products from the acid along with unreacted ethylene, condensing the ethyl alcohol from the gas, and recycling the ethylene gas together with fresh ethylene gas again into contact with the sulfuric acid, the sulfuric acid being maintained in strength between 20 and 80% by addition of water vapor providing material sufficient to compensate for the vaporization of water vapor from the sulfuric acid during the process and maintaining the acid concentration substantially uniform.

10. In the process of simultaneously making ethyl alcohol and ethyl ether by catalytic synthesis from ethylene and water in contact with dilute aqueous sulphuric acid, the method of controlling the relative quantities of ethyl alcohol and ethyl ether produced which consists in adding the undesired material to the reaction mixture to inhibit the production of said undesired material.

11. A process of manufacturing ethyl alcohol from ethylene, which comprises bringing ethylene-containing gas into contact with a substantial body of sulphuric acid under a pressure above atmospheric and at a preferred temperature of 240 to 300° F. and at a concentration of acid sufficient to cause the hydration of a minor percentage only of the ethylene in a single passage through the acid into ether and ethyl alcohol and a simultaneous volatilization of the hydration products from the acid along with the unreacted ethylene, condensing the ethyl alcohol from the gas, and recycling the unreacted ethylene gas together with fresh ethylene gas and ether again into contact with the sulphuric acid.

12. A process of manufacturing ethylene alcohol from ethylene, which comprises bringing the ethylene-containing gas into contact with a substantial body of dilute sulphuric acid at a temperature sufficient to cause hydration of a part only of the ethylene in a single passage into ethyl alcohol and to volatilize simultaneously the ethyl alcohol from the acid along with the unreacted ethylene, condensing the ethyl alcohol from the gas, recycling the unreacted ethylene gas together with fresh ethylene gas again into contact with sulphuric acid.

13. A process of manufacturing ethylene alcohol from ethylene, which comprises bringing the ethylene-containing gas into contact with a substantial body of sulphuric acid at a temperature and concentration of acid sufficient to cause hydration of a part only of the ethylene in a single passage into ethyl alcohol and to volatilize simultaneously the ethyl alcohol from the acid along with the unreacted ethylene, condensing the ethyl alcohol from the gas, recycling the unreacted ethylene gas together with fresh ethylene gas again into contact with sulphuric acid, the absorption reaction being carried out at a pressure above atmospheric.

14. A process of manufacturing ethylene alcohol from ethylene, which comprises bringing the ethylene-containing gas into contact with a substantial body of sulphuric acid at a temperature and concentration of acid sufficient to cause hydration of a part only of the ethylene in a single passage into ethyl alcohol and to volatilize simultaneously the ethyl alcohol from the acid along with the unreacted ethylene, condensing the ethyl alcohol from the gas, recycling the unreacted ethylene gas together with fresh ethylene gas again into contact with sulphuric acid, the absorption reaction being carried out at a preferred temperature of 240° to 300° F.

15. A process of manufacturing ethylene alcohol from ethylene, which comprises bringing the ethylene-containing gas into contact with a substantial body of dilute sulphuric acid at a temperature and concentration of acid sufficient to cause hydration of a part only of the ethylene in a single passage into ethyl alcohol and to volatilize simultaneously the ethyl alcohol from the acid along with the unreacted ethylene, condensing the ethyl alcohol from the gas, recycling the unreacted ethylene gas together with fresh ethylene gas again into contact with sulphuric acid, the absorption reaction being carried out with sulphuric acid of a strength between 20 to 80% and at a temperature approximately 240° to 300° F. and at a pressure above atmospheric.

16. In a process of making ethyl alcohol and ethyl ether by catalytic synthesis from ethylene and water in contact with aqueous sulphuric acid of a strength of 20 to 80%, a method of controlling the relative quantities of ethyl alcohol and ethyl ether produced which consists in adding the undesired material to the reaction mixture to inhibit the production of said undesired material while maintaining a pressure above atmospheric on the reaction zone.

17. A process of manufacturing ethyl alcohol and ethyl ether from ethylene, which comprises bringing ethylene containing gas into contact with the substantial body of dilute sulphuric acid at a temperature and concentration of acid sufficient to cause an absorption of only a small fraction of the ethylene in a single passage of the ethylene together with the simultaneous conversion of the same into ethyl alcohol and ethyl ether, and a simultaneous volatilization of such products from the acid along with the unreacted ethylene, condensing one of the reaction products from the gas and recycling the unreacted ethylene gas with the other reaction product and fresh gas into contact with the acid, whereby there is finally secured a conversion of the major fraction of the ethylene material into one only of such reaction products.

WILLIAM H. SHIFFLER.
MELVIN M. HOLM.